(12) United States Patent
Kano et al.

(10) Patent No.: US 6,297,478 B1
(45) Date of Patent: Oct. 2, 2001

(54) THERMAL PROCESSING APPARATUS FOR A BAND FILM

(75) Inventors: Yoshinobu Kano; Tetsuya Tsumura; Kazuhiro Murakami; Osamu Miyazaki; Kiyoshi Hino, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/139,776

(22) Filed: Aug. 25, 1998

(51) Int. Cl.[7] .............................. B65B 47/02; B29C 59/02
(52) U.S. Cl. ............................................ 219/388; 219/243
(58) Field of Search ........................ 219/388, 216, 219/243, 229; 156/380.9, 499, 510; 264/293, 280, 492, 493, 319; 392/417, 418; 101/3.1; 34/266, 268, 273; 53/37.7, 370.8, 371.6, 373.7, 373.8, 375.9, 377.7

(56) References Cited

U.S. PATENT DOCUMENTS

| | | | | |
|---|---|---|---|---|
| 2,479,913 | * | 8/1949 | Doyle | 392/417 |
| 2,680,304 | * | 6/1954 | Herbert | 392/417 |
| 3,117,345 | * | 1/1964 | Campbell | 18/20 |
| 3,164,717 | * | 1/1965 | Kaufman | 392/417 |
| 3,321,197 | * | 5/1967 | Parslow | 392/417 |
| 3,382,789 | * | 5/1968 | Barker | 95/89 |
| 3,829,982 | * | 8/1974 | Pray et al. | 34/277 |
| 3,864,546 | * | 2/1975 | Cahnman et al. | 392/417 |
| 3,894,343 | * | 7/1975 | Pray et al. | 34/278 |
| 4,001,066 | * | 1/1977 | Channing et al. | 156/499 |
| 4,015,340 | * | 4/1977 | Treleven | 34/278 |
| 4,110,150 | * | 8/1978 | Ostrowski et al. | 156/499 |
| 4,740,342 | * | 4/1988 | Menard et al. | 264/549 |
| 4,783,908 | * | 11/1988 | Pabst | 34/273 |
| 5,308,954 | * | 5/1994 | Manock et al. | 219/243 |

FOREIGN PATENT DOCUMENTS 9-240625   9/1997   (JP) .

* cited by examiner

Primary Examiner—John A. Jeffery
(74) Attorney, Agent, or Firm—Connolly Bove Lodge & Hutz

(57) ABSTRACT

A heating unit includes a pair of heating bodies for heating a band film conveyed along a predetermined film feeding path defined by a film guide. An embossing unit includes a punch and a die for forming a predetermined raised pattern on a heated surface of the band film. A shifting mechanism locates the heating unit and the embossing unit closely by a first distance during a thermal processing of the band film and separates at least one of the heating unit and the band film far away from the other by a second distance larger than the first distance when the thermal processing is interrupted or stopped.

10 Claims, 10 Drawing Sheets

THERMAL PROCESSING APPARATUS FOR A BAND FILM

BACKGROUND OF THE INVENTION

The present invention relates to a thermal processing apparatus for a band film, preferably used for embossing a carrier tape accommodating chip components.

In general, a thermal processing of a band film comprises a preheating of a portion of the band film by a heating unit and a succeeding embossing of the heated portion into a predetermined pattern by an embossing unit. The same pattern is continuously formed on the surface of the band film by repetitively applying the heating and the embossing on the band film advancing with a predetermined pitch.

In such a thermal processing apparatus repeating the same sequential operations, a higher productivity is realized by reducing the time required for accomplishing one cycle of the thermal processing. To this end, it is desirable to locate the heating unit adjacent to the embossing unit.

As the band film advances with the same pitch and the same timing when the thermal processing is continuously performed, the temperature of the next processed surface of the band film is stably increased to substantially the same value.

However, a problem arises when the thermal processing is interrupted or stopped because a portion of the band film located immediately before the embossing unit is subjected to high temperature of the heating unit for a long time. This will excessively increase the temperature of the first processed portion of the band film in the resumed thermal processing.

Furthermore, the heat radiated from the heating unit will possibly deform or shrink a finished embossed portion of the band film staying at the embossing unit located adjacent to the heating unit during a dormant period of the thermal processing apparatus.

SUMMARY OF THE INVENTION

An object of the present invention is to provide a thermal processing apparatus for a band film capable of stabilizing the heating of a band film and improving the quality of the embossing applied on a heated surface of the band film.

In order to accomplish the above and other related objects, one aspect of the present invention provides a thermal processing apparatus comprising a heating unit including a pair of heating bodies for heating a band film conveyed along a predetermined film feeding path defined by a film guide, an embossing unit including a punch and a die for forming a predetermined raised pattern on a heated surface of the band film, and a shifting mechanism for locating the heating unit and the embossing unit closely by a first distance during a thermal processing of the band film and for separating at least one of the heating unit and the band film far away from the other by a second distance larger than the first distance when the thermal processing is interrupted or stopped.

Preferably, the second distance between the heating unit and the embossing unit separated by the shifting mechanism is equivalent to 0.8 to 2.0 times a width of the band film.

Another aspect of the present invention provides a thermal processing apparatus comprising a heating unit including a pair of heating bodies each accommodating a heater, a first shifting mechanism for locating the heating bodies to a first position where the heating bodies are positioned closely to both surfaces of a band film conveyed along a predetermined film feeding path defined by a film guide, an embossing unit including a punch and a die disposed adjacent to the heating bodies located at the first position for forming a predetermined raised pattern on a heated surface of the band film, and a second shifting mechanism for locating the heating bodies to a second position where the heating bodies are kept far away from the band film.

Preferably, the second shifting mechanism shifts the heating bodies to the second position when a thermal processing of the band film is interrupted or stopped. The second shifting mechanism shifts the heating bodies in a direction different from the film feeding path. A preferable shifting direction of the heating bodies by the second shifting mechanism is normal to the film feeding path. Moreover, the second shifting mechanism may comprise a transfer frame mounting the heating bodies. The second shifting mechanism may include an air cylinder shifting the transfer frame. An optimum result is obtained when the second shifting mechanism keeps the heating bodies far away from the band film by a distance equivalent to 0.8 to 2.0 times a width of the band film. The first shifting mechanism may comprise a cam and a cam follower.

Another aspect of the present invention provides a thermal processing apparatus comprising a heating unit including a pair of heating bodies positioned closely to both surfaces of a band film conveyed along a predetermined film feeding path defined by a film guide, an embossing unit including a punch and a die for forming a predetermined raised pattern on a heated surface of the band film, and a shifting mechanism for selectively locating the band film to a first position where the band film is positioned closely to the heating bodies and a second position where the band film is kept far away from the heating bodies.

Preferably, the shifting mechanism moves the film guide for shifting the band film between the first position and the second position. The shifting mechanism moves the embossing unit together with the film guide. The shifting mechanism shifts the film guide in a direction different from the film feeding path. A preferable shifting direction of the film guide by the shifting mechanism is normal to the film feeding path. The shifting mechanism may comprise a transfer frame mounting the film guide. The shifting mechanism may include an air cylinder shifting the transfer frame. An optimum result is obtained when the shifting mechanism keeps the film guide far away from the heating bodies by a distance equivalent to 0.8 to 2.0 times a width of the band film.

Another aspect of the present invention provides a thermal processing apparatus comprising a heating unit including a pair of heating bodies each accommodating a heater, a first shifting mechanism for locating the heating bodies to a first position where the heating bodies are positioned closely to both surfaces of a band film conveyed along a predetermined film feeding path defined by a film guide, an embossing unit including a punch and a die disposed adjacent to the heating bodies located at the first position for forming a predetermined raised pattern on a heated surface of the band film, and a second shifting mechanism for locating the heating bodies to a second position where the heating bodies are kept far away from the embossing unit.

Preferably, the second shifting mechanism shifts the heating bodies to the second position when a thermal processing of the band film is interrupted or stopped. The second shifting mechanism shifts the heating bodies in a direction parallel to the film feeding path. The second shifting mechanism may comprise a transfer frame mounting the heating bodies. The second shifting mechanism may include an air cylinder shifting the transfer frame. The first shifting mechanism may comprise a cam and a cam follower.

Another aspect of the present invention provides a thermal processing apparatus comprising a heating unit including a pair of heating bodies for heating a band film conveyed along a predetermined film feeding path defined by a film guide, an embossing unit including a punch and a die for forming a predetermined raised pattern on a heated surface of the band film, and a shifting mechanism for selectively locating the heating bodies to a first position where the heating bodies are positioned closely to the band film and a second position where the heating bodies are kept far away from the band film.

Preferably, the shifting mechanism shifts the heating bodies in a direction different from the film feeding path. A preferable shifting direction of the heating bodies by the shifting mechanism is normal to the film feeding path. The shifting mechanism may comprise a pair of actuators shifting the heating bodies independently.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained in more detail with reference to FIGS. 1 through 10. Identical parts are denoted by the same reference numerals throughout the drawings.

First Embodiment

Figure 1:
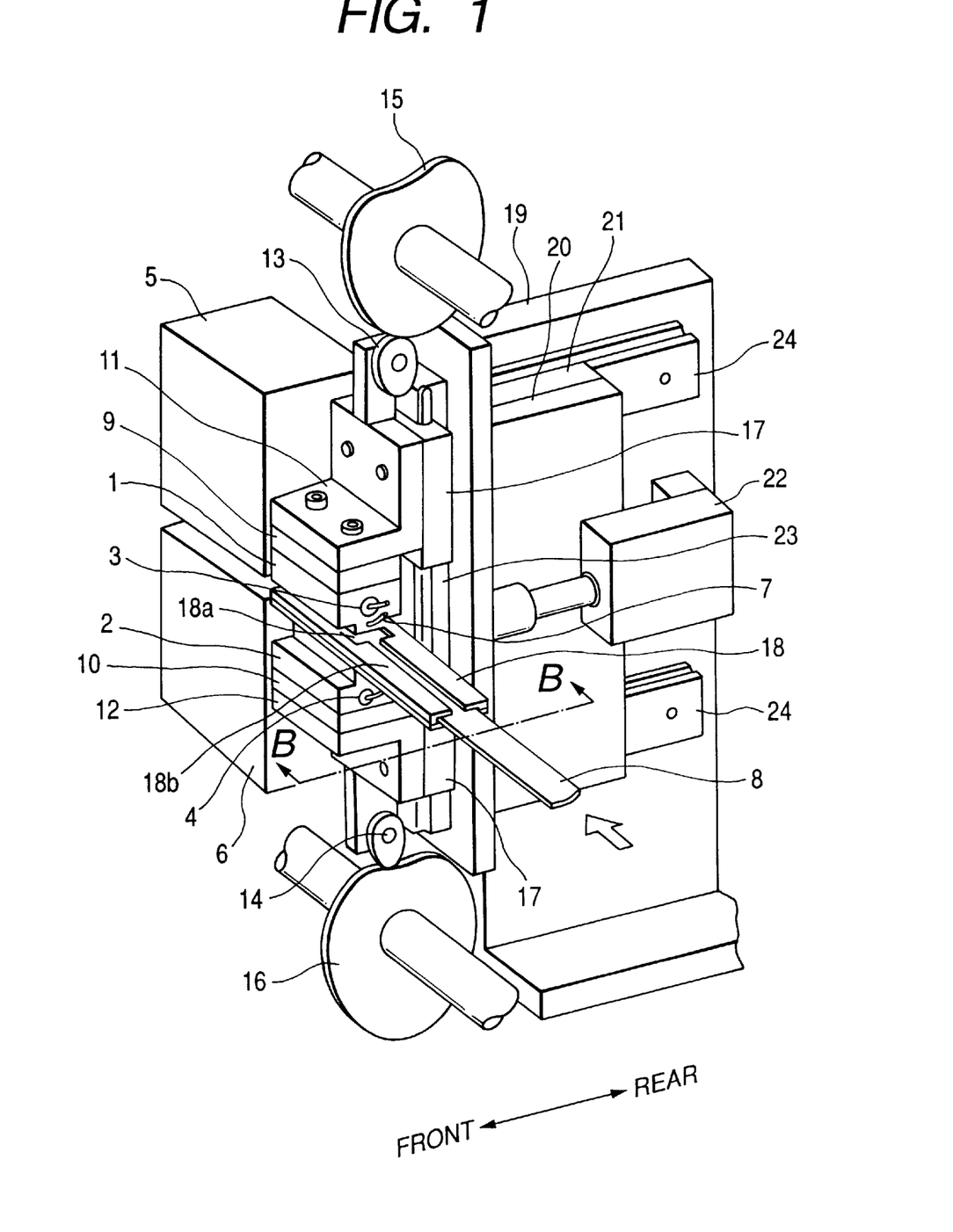
FIG. 1 is a perspective view showing a schematic arrangement of a thermal processing apparatus for a band film in accordance with a first embodiment of the present invention.

A thermal processing apparatus shown in FIG. 1 comprises an upper heating body 1 and a lower heating body 2 that are made of a heat conductive metallic material. An upper heater 3 is accommodated in the upper heating body 1. A thermocouple 7, detecting a temperature of the upper heating body 1, is provided closely to a lower end of the upper heating body 1. Similarly, a lower heater 4 and a thermocouple (not shown) are accommodated in the lower heating body 2.

The upper heating body 1 is fixed to an upper frame 11 via an upper heat-insulation plate 9 that has low heat conductivity and high heat durability. Similarly, the lower heating body 2 is fixed to a lower frame 12 via a lower heat-insulation plate 10 that has low heat conductivity and high heat durability.

A punch 5 is provided adjacent to the upper heating body 1. A die 6 is provided adjacent to the lower heating body 2.

A band film 8 comes from a roll of a hooped film assembly (not shown) and enters intermittently into the thermal processing apparatus along a predetermined film feeding path defined by a heat-resistive metallic film guide 18.

Figure 4:
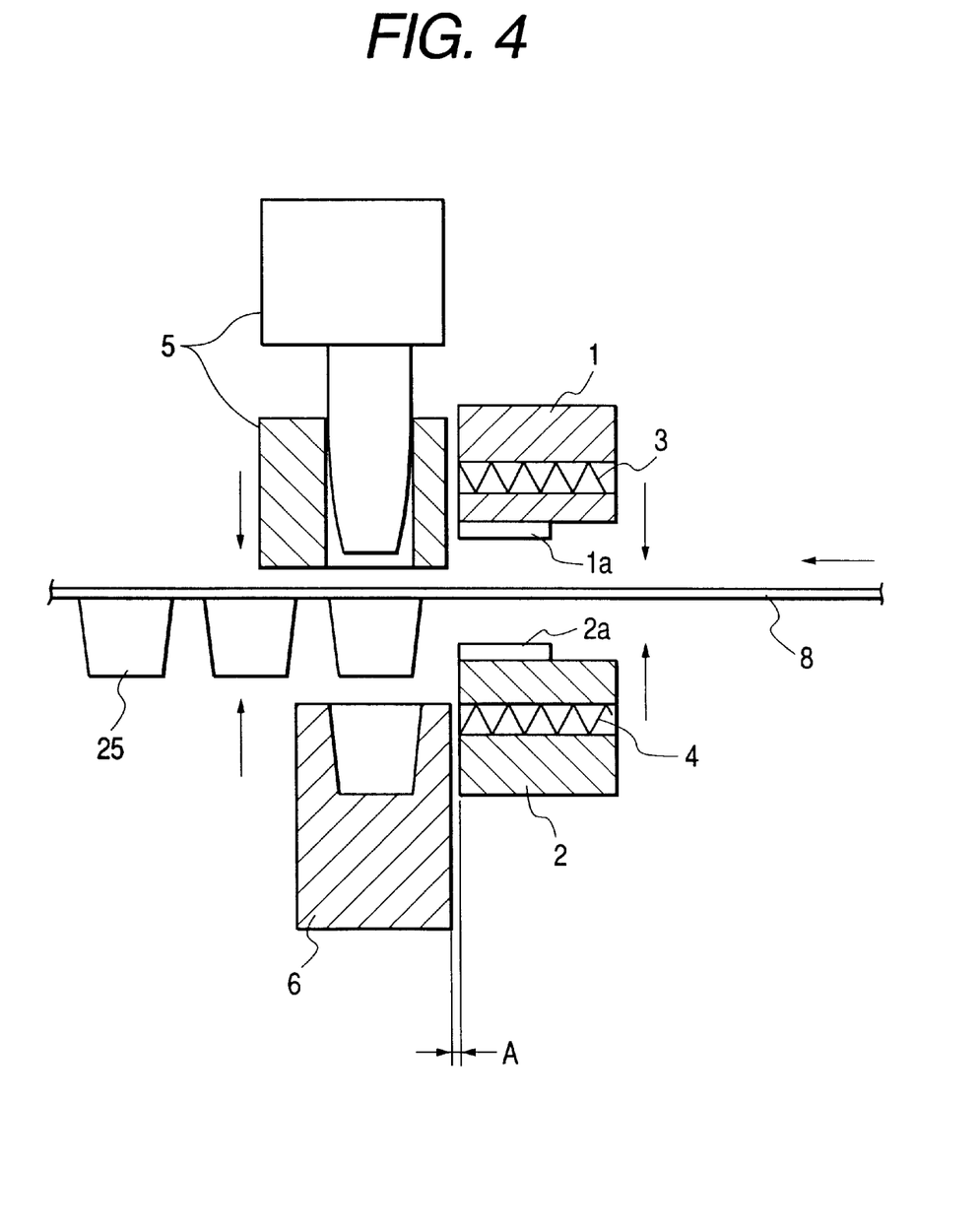
FIG. 4 is a partly cross-sectional front view illustrating an embossing operation of the band film thermal processing apparatus in accordance with the resent invention.

The upper and lower heating bodies 1 and 2 oppose each other in an up-and-down direction with a predetermined intervening space across which the band film 8 is guided along the film guide 18, when they are positioned at a predetermined heating position as shown in FIG. 4. The upper and lower heating bodies 1 and 2 are symmetrically slidable in the up-and-down direction. A pair of heat transfer portions 1a and 2a are provided on the opposing faces of the upper and lower heating bodies 1 and 2.

The upper and lower heaters 3 and 4 generate heat that is radiated from the heat transfer portions 1a and 2a of the heating bodies 1 and 2 to the upper and lower surfaces of band film 8, respectively.

After the band film 8 is heated by the upper and lower heaters 3 and 4, a heated surface of the band film 8 advances with a predetermined pitch into an intervening space between the punch 5 and die 6 along the film feeding path in response to actuation of an appropriate transfer mechanism (not shown). As a result of every advance movement of the band film 8, the heated surface of the band film 8 arrives at an embossing position where the punch 5 and the die 6 engage each other in the up-and-down direction. The punch 5 has a protruding shape fitting to a recess of the die 6. The punch 5 and the die 6 are synchronously shiftable in the up-and-down direction so as to form a raised pattern 25 on the heated surface of the band film 8 when they are engaged.

The heating bodies 1 and 2 cooperatively constitute a heating unit. The punch 5 and the die 6 cooperatively constitute an embossing unit. The heating unit and the embossing unit neighbor each other with a small gap "A" as shown in FIG. 4.

The above-described sequential steps of heating the band film 8 and forming the raised pattern 25 on the heated surface of the band film 8 are one cycle of the thermal processing. The thermal processing apparatus continuously repeats the above-described cycle of the thermal processing and always completes each thermal processing cycle when an operator manipulates to stop the apparatus. Hence, the heated surface of the band film 8 is surely conveyed to the embossing position and subjected to the embossing by the punch 5 and the die 6 before stopping the thermal processing.

An operation of the heating unit is in synchronism with an operation of the embossing unit, except for starting and final cycles. During the starting cycle, the heating unit performs the above-described heating operation while the embossing unit does not start its operation. On the contrary, during the final thermal processing cycle, the heating unit stops its operation while the embossing unit performs the above-described embossing operation.

The film guide 18 has upper and lower rectangular openings 18a provided between two guide grooves 18b extending along the opposing sides thereof. The upper and lower rectangular openings 18a are enlarged at the portion corresponding to the upper and lower heat transfer portions 1a and 2a so as to allow the heat transfer portions 1a and 2a to pass. The guide grooves 18b cooperatively support and guide both ends of the band film 8 advancing along the film feeding path.

An upper cam follower 13 is rotatably supported at an upper end of the upper frame 11. The upper cam follower 13 is brought into contact with an upper cam 15. In the same manner, a lower cam follower 14 is rotatably supported at a lower end of the lower frame 12. The lower cam follower 14 is brought into contact with a lower cam 16. The upper and lower cams 15 and 16 are linked with an appropriate driving mechanism (not shown). The upper and lower frames 11 and 12 are fixed to a pair of slide guides 17 slidable along a guide rail 23 extending in the up-and-down direction.

Thus, the upper and lower heating bodies 1 and 2, attached to the upper and lower frames 11 and 12, cause symmetrical up-and-down shift movements according to predetermined timings and strokes defined by the cam profiles formed on the corresponding cams 15 and 16, respectively.

A stationary base frame 19 has a vertical surface on which a pair of parallel guide rails 24 extending horizontally in a back-and-forth direction. An air cylinder 22 is fixed on the same surface of the base frame 19 and connected to the T-shaped transfer frame 20. The transfer frame 20 is mounted on a pair of slide guides 21 shiftable along the horizontally extending parallel guide rails 24 in the back-and-forth direction normal to the film feeding path. The guide rail 23 is fixed on a front face of the T-shaped transfer frame 20. Thus, the upper and lower heating bodies 1 and 2 are shiftable in the up-and-down direction by the first shifting mechanism realized by the slide guides 17 and the guide rail 23 as well as in the back-and-forth direction realized by a second shifting mechanism realized by the slide guides 21 and the guide rails 24.

An operation of the above-described heating unit will be explained in more detail hereinafter.

Figure 3:
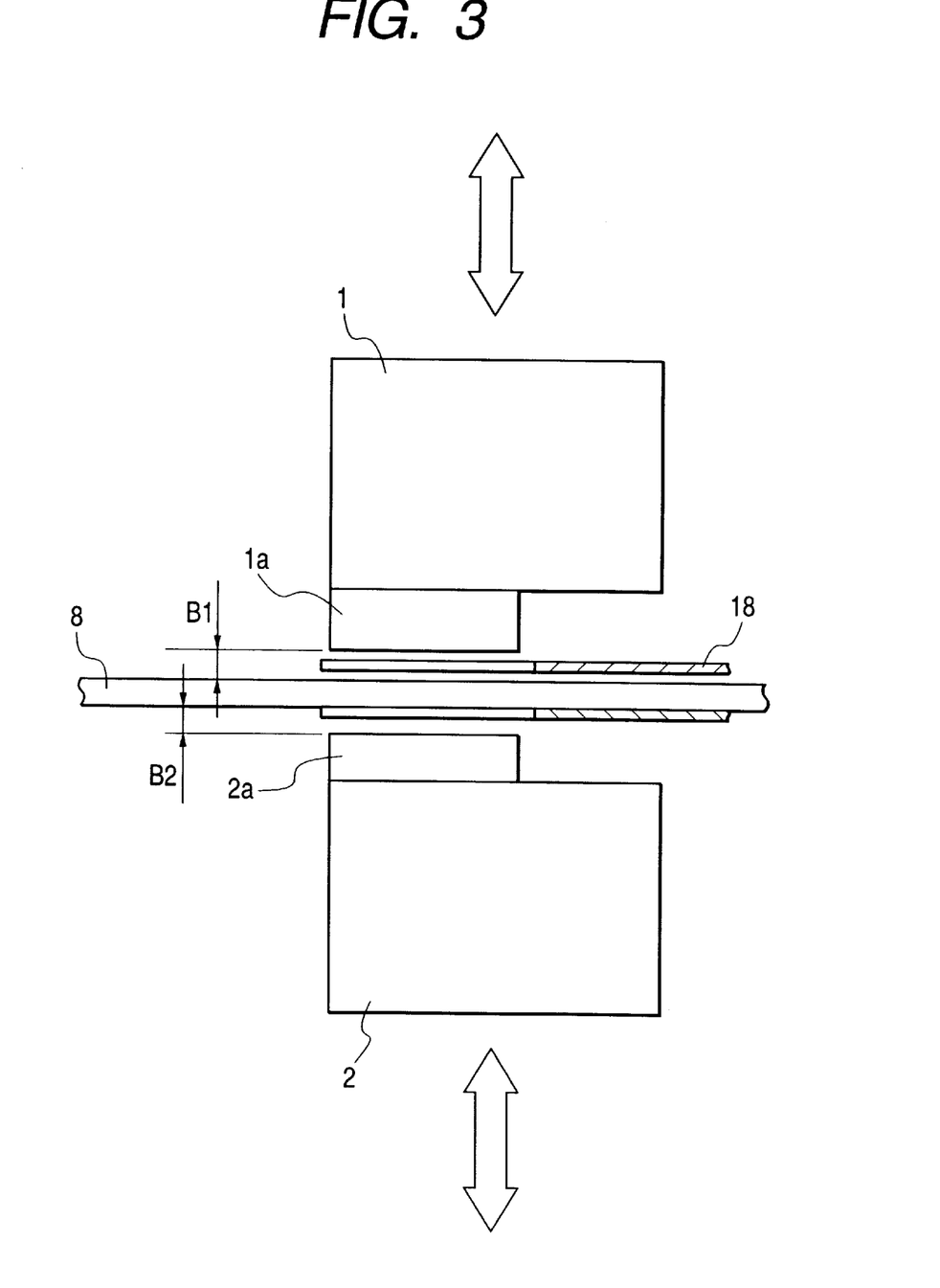
FIG. 3 is a partly cross-sectional front view illustrating a heating operation of the band film thermal processing apparatus in accordance with the present invention.

The band film 8 is conveyed into the space between the upper and lower heating bodies 1 and 2. A portion of the band film 8 is placed at the rectangular opening 18a of the film guide 18. The upper and lower heating bodies 1 and 2 advance toward the band film 8 in response to the rotational movements of the cams 15 and 16, as shown in FIG. 3.

In this case, the film guide 18 restricts the up-and-down vibration of the band film 8. Thus, a clearance between the upper heat transfer portion 1a of the upper heating body 1 and the upper surface of the band film 8 is maintained in a range of 0.05 to 0.1 mm. In the same manner, a clearance between the lower contact portion 2a of the lower heating body 2 and the lower surface of the band film 8 is maintained in a range of 0.05 to 0.1 mm. The upper and lower heaters 3 and 4 generate heat that is transmitted by radiation from the heat transfer portions 1a and 2a to the surfaces of the band film 8. The temperature of the heated surface of the band film 8 increases to the predetermined value.

Then, the band film 8 advances into the embossing unit with the predetermined pitch so that the heated surface of the band film is located at the embossing position and subjected to the above-described embossing operation by the punch 5 and the die 6.

Figure 2:
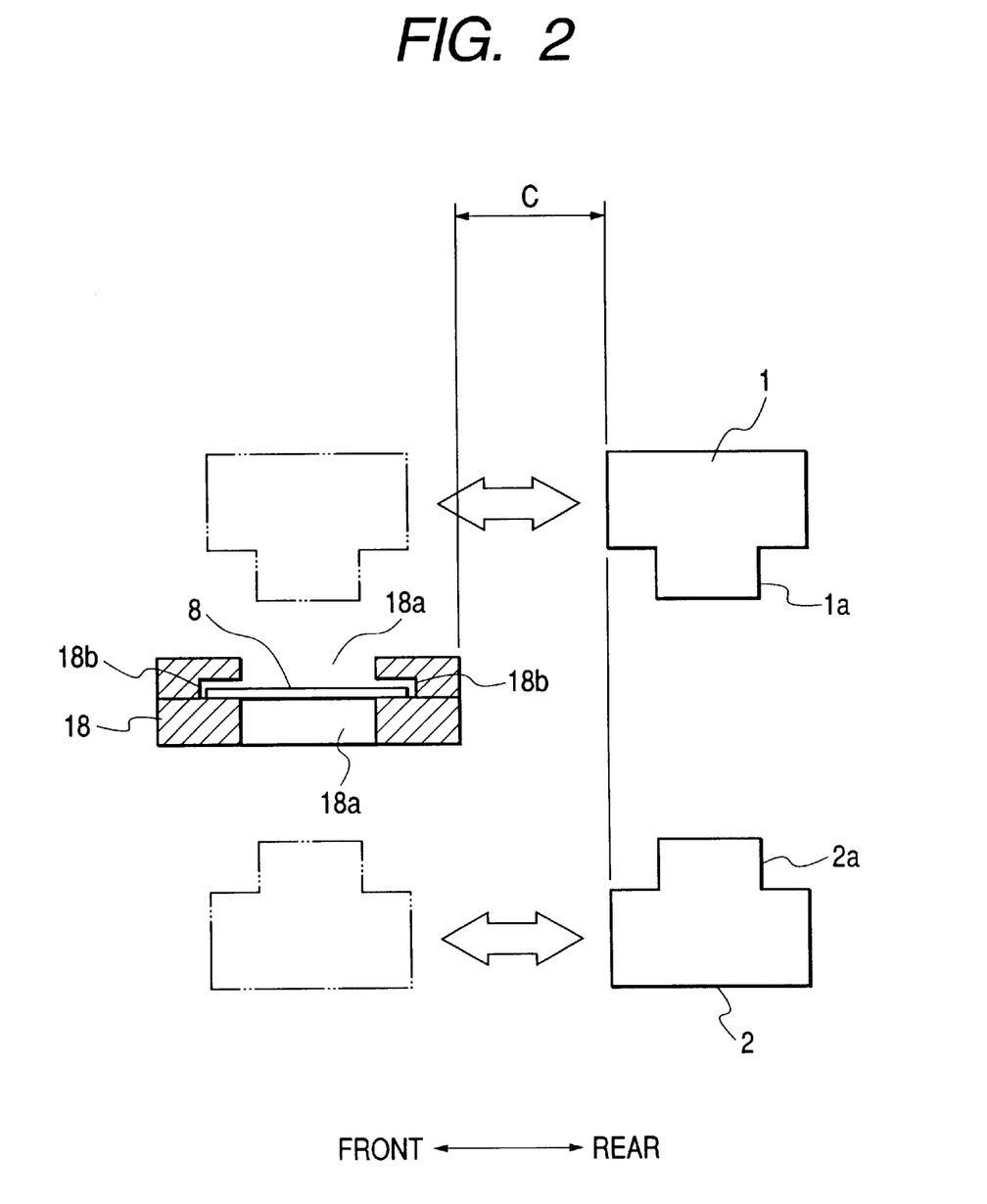
FIG. 2 is a partly cross-sectional side view showing a retracted condition of a heating unit in accordance with the first embodiment of the present invention, seen along a line B—B shown in FIG. 1.

Upon interruption or completion of the thermal processing of the band film 8, the air cylinder 22 shifts the transfer frame 20 rearward. The heating unit retracts far from the band film 8 so as to keep a horizontal distance "C" between the film guide 18 and each heating body 1 or 2 as shown in FIG. 2. The distance "C" is larger than the gap "A" and is preferably 0.8~2.0 times the width of the band film 8. No thermal damage or adverse influence is given to the band film 8.

When the thermal processing of the band film 8 resumes or restarts, the air cylinder 22 shifts the transfer frame 20 forward to place the heating unit on the film feeding path.

With the above-described back-and-forth shift movement of the heating bodies 1 and 2, it becomes possible to keep the band film 8 far away from the heating bodies 1 and 2 during the dormant period of the thermal processing apparatus.

According to the above-described embodiment, the second shifting mechanism realized by the slide guides 21 and the guide rails 24 shifts the heating bodies 1 and 2 in a direction different from, preferably normal to, the film feeding path.

Needless to say, it is possible to replace the cam mechanism and the air cylinder used in the above-described embodiment by any other mechanical or electrical actuators.

Second Embodiment

Figure 5:
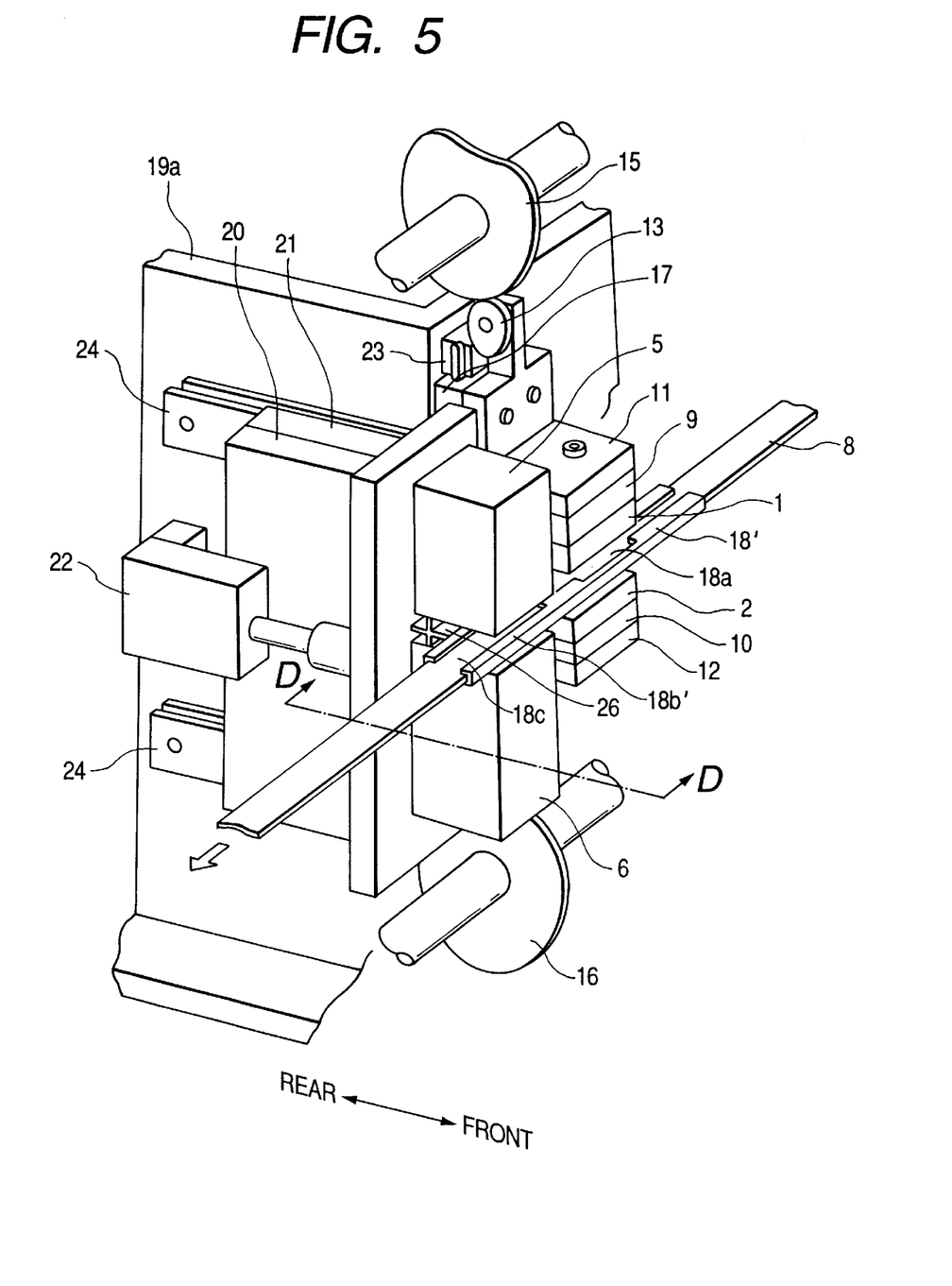
FIG. 5 is a perspective view showing a schematic arrangement of a modified band film thermal processing apparatus in accordance with a second embodiment of the present invention.

FIG. 5 is a schematic arrangement of a modified thermal processing apparatus for a band film in accordance with a second embodiment of the present invention.

The second embodiment shown in FIG. 5 differs from the first embodiment shown in FIG. 1 in that the embossing unit and the film guide are shiftable together in the back-and-forth direction to keep the band film away from the heating unit.

In the same manner as the first embodiment, the upper and lower heating bodies 1 and 2 are respectively fixed to the upper and lower frames 11 and 12 via heat-insulation plates 9 and 10. The upper and lower frames 11 and 12 are supported by the slide guides 17 slidable along the guide rail 23 extending in the up-and-down direction. The guide rail 23 is directly fixed to a stationary base frame 19a. Thus, the upper and lower heating bodies 1 and 2 cooperatively cause a symmetrical shift movement only in the up-and-down direction according to predetermined timings and strokes defined by the cam profiles formed on the corresponding cams 15 and 16 that are linked with the upper and lower frames 11 and 12, respectively.

The stationary base frame 19a has a vertical surface on which the parallel guide rails 24 extend horizontally in the back-and-forth direction. The air cylinder 22, fixed to the base frame 19a, is connected to the T-shaped transfer frame 20. The T-shaped transfer frame 20 is mounted on the slide guides 21 that are slidably guided by the horizontal guide rails 24 in the back-and-forth direction normal to the film feeding path. The T-shaped transfer frame 20 mounts both the punch 5 and the die 6 on its front face.

The band film 8 comes from a roll of a hooped film assembly (not shown) and enters intermittently into the thermal processing apparatus along a predetermined film feeding path defined by a heat-resistive metallic film guide 18'. The film guide 18' has elongated guide grooves 18b' extending across the space between the punch 5 and die 6. A widened slit 18c, formed between the elongated guide grooves 18b', allows the punch 5 and die 6 to perform the embossing operation without causing any interference between the film guide 18' and the embossing unit.

A retainer 26 securely fixes the elongated film guide 18' to the transfer frame 20 as well as to the bodies of the punch 5 and the die 6. Thus, the film guide 18' is shiftable together with the embossing unit in the back-and-forth direction.

Figure 6:
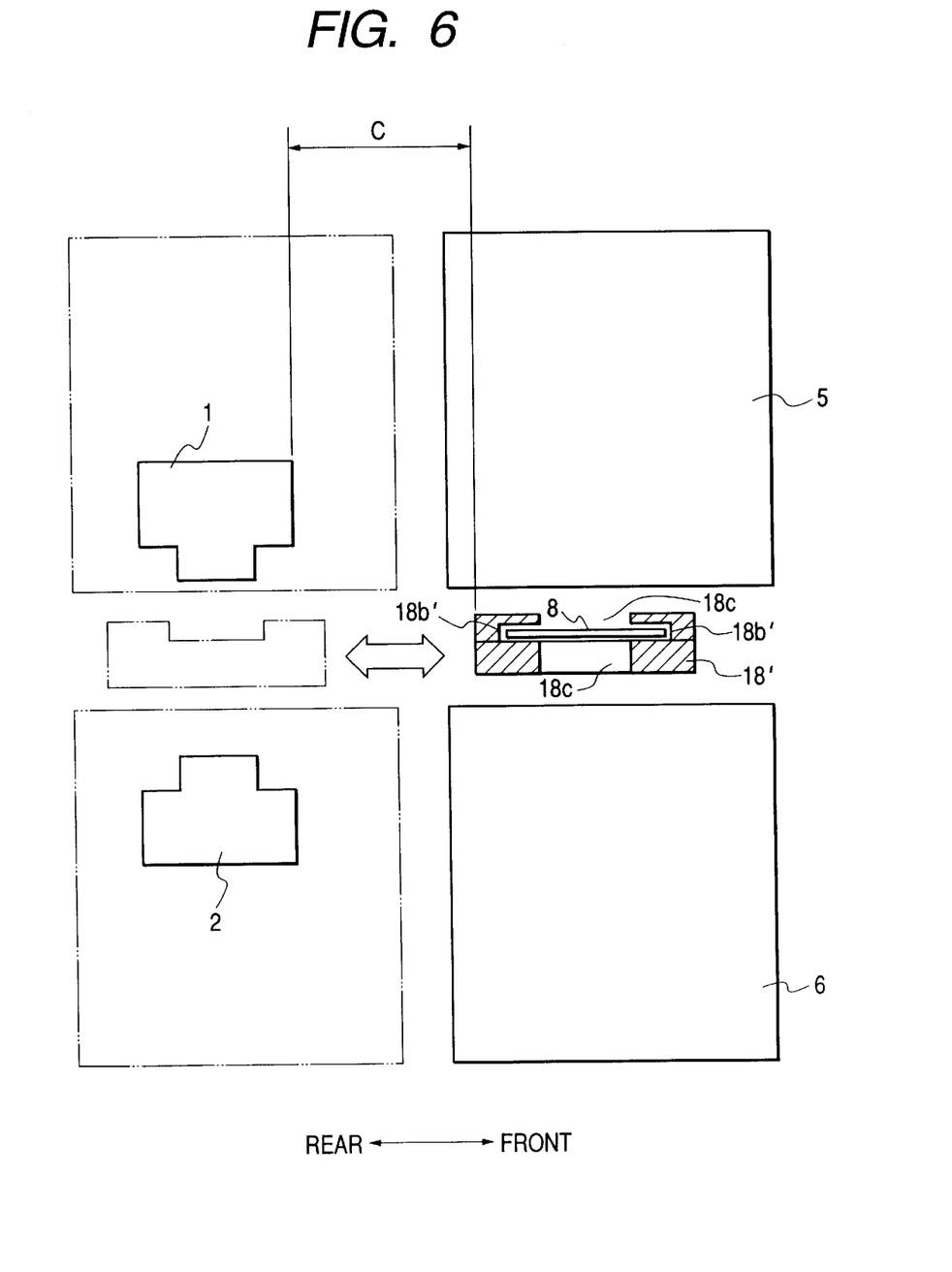
FIG. 6 is a partly cross-sectional side view showing a protruded condition of an embossing unit in accordance with the second embodiment of the present invention, seen along a line D—D shown in FIG. 5.

Upon interruption or completion of the thermal processing of the band film 8, the air cylinder 22 shifts the transfer frame 20 forward. The embossing unit (i.e., punch 5 and die 6) and the film guide 18' protrude far from the heating unit (i.e., heating bodies 1 and 2) so as to keep the above-described horizontal distance "C" between the film guide 18' and each heating body 1 or 2 as shown in FIG. 6.

When the thermal processing of the band film 8 resumes or restarts, the air cylinder 22 retracts the transfer frame 20 rearward to return the embossing unit and the band film 8 to their home positions adjacent to the heating unit.

With the above-described back-and-forth shift movement of the film guide 18 and the embossing unit, it becomes possible to keep the band film 8 far away from the heating bodies 1 and 2 during the dormant period of the thermal processing apparatus.

According to the above-described second embodiment, the shifting mechanism realized by the slide guides 21 and the guide rails 24 shifts the film guide 18 in a direction different from, preferably normal to, the film feeding path.

As a modification of the above-described second embodiment, it is possible to fix the embossing unit (punch 5 and the die 6) stationarily to the base frame 19a and fix only the film guide 18' to the transfer frame 20. In this case, only the film guide 18' protrudes far from the heating unit (i.e., heating bodies 1 and 2) so as to keep the above-described horizontal distance "C" between the film guide 18' and each heating body 1 or 2.

Third Embodiment

Figure 7:
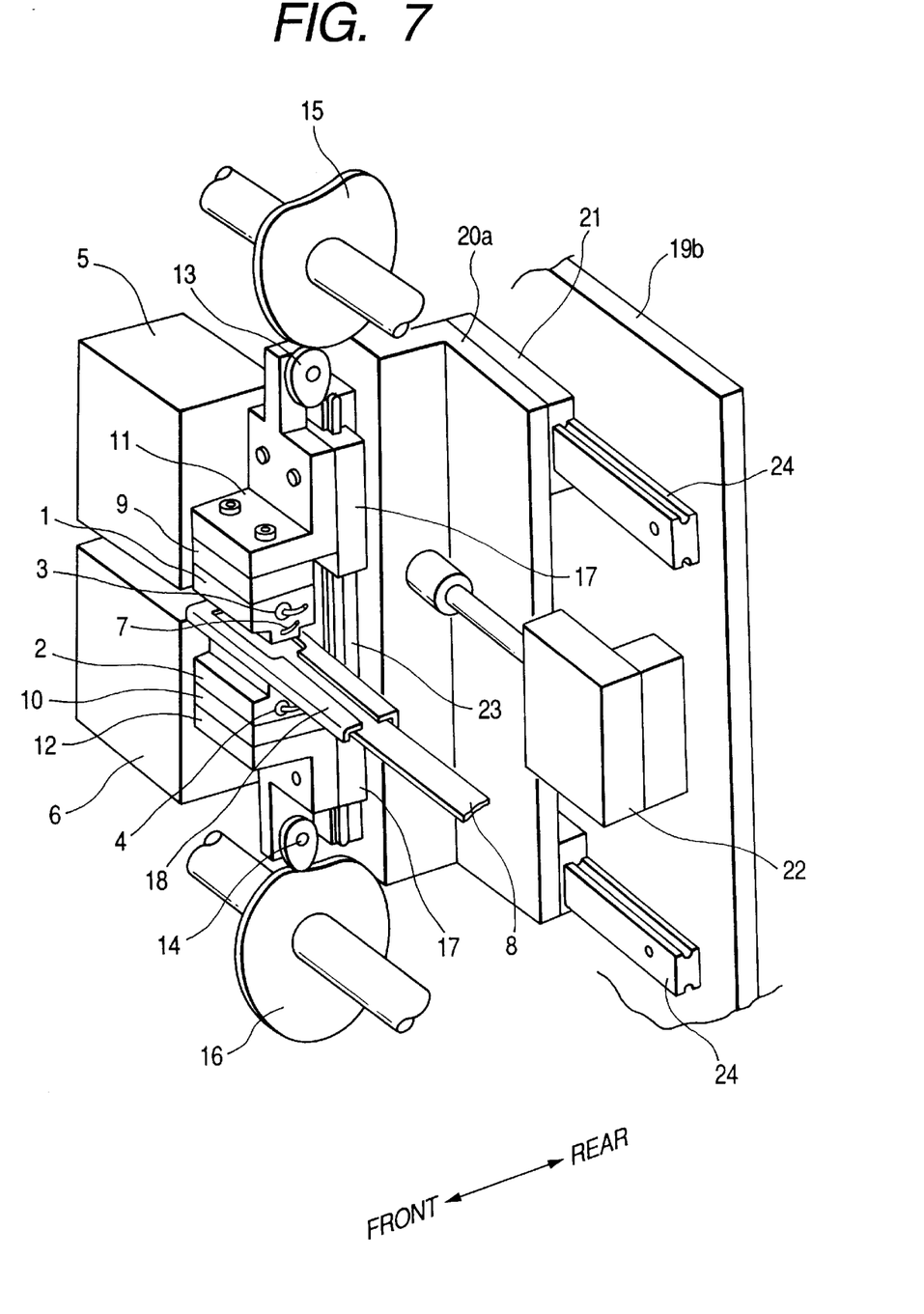
FIG. 7 is a perspective view showing a schematic arrangement of another modified band film thermal processing apparatus in accordance with a third embodiment of the present invention.

FIG. 7 is a schematic arrangement of a modified band film thermal processing apparatus in accordance with a third embodiment of the present invention.

The third embodiment shown in FIG. 7 differs from the first embodiment shown in FIG. 1 in that the heating unit is shiftable in parallel to the film feeding path to keep the accomplished raised pattern 25 of the band film 8 away from the heating unit.

In the same manner as the first embodiment, the upper and lower heating bodies 1 and 2 are respectively fixed to the upper and lower frames 11 and 12 via heat-insulation plates 9 and 10. The upper and lower frames 11 and 12 are supported by the slide guides 17 slidable along the guide rail 23 extending in the up-and-down direction. The guide rail 23 is fixed on a frontmost face of a cranked transfer frame 20a. A step-down face of the transfer frame 20 is supported by the slide guides 21 slidable along the parallel guide rails 24 extending horizontally in the same direction as the film feeding path.

A stationary base frame 19b has a vertical surface on which the parallel guide rails 24 are fixed. The air cylinder 22 is fixed on the surface of the base frame 19b and connected to the cranked transfer frame 20a. Thus, the upper and lower heating bodies 1 and 2 are shiftable in a direction parallel to the film feeding path as well as the up-and-down direction.

More specifically, the upper and lower heating bodies 1 and 2 cooperatively cause a symmetrical up-and-down shift movement according to predetermined timings and strokes defined by the cam profiles formed on the corresponding cams 15 and 16 that are linked with the upper and lower frames 11 and 12, respectively.

Figure 8:
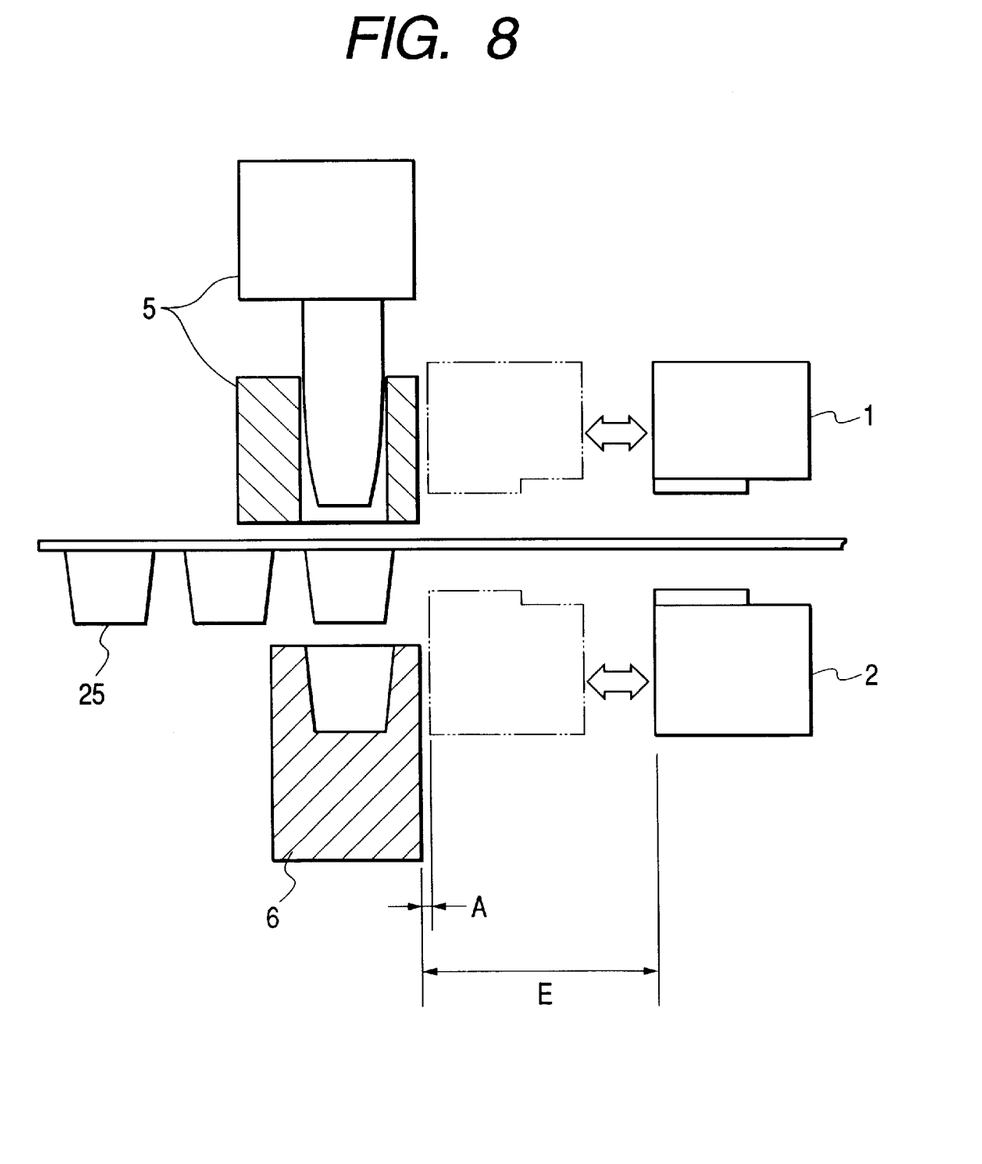
FIG. 8 is a partly cross-sectional front view showing a laterally shifted condition of the heating unit in accordance with the third embodiment of the present invention.

Upon interruption or completion of the thermal processing of the band film 8, the air cylinder 22 shifts the transfer frame 20a laterally along the film feeding path. The heating unit (i.e., heating bodies 1 and 2) is located far from the embossing unit (i.e., punch 5 and die 6) so as to keep a predetermined distance "E" between the heating unit and the embossing unit as shown in FIG. 8. The distance "E", that is larger than the gap "C", should be determined by considering the adverse influences given from the heating unit.

When the thermal processing of the band film 8 resumes or restarts, the air cylinder 22 returns the transfer frame 20a to the home position adjacent to the embossing unit.

With this lateral shift movement of the heating unit, it becomes possible to keep the accomplished raised pattern 25 of the band film 8 away from the heating bodies 1 and 2 during the dormant period of the thermal processing condition. Furthermore, the next processed portion of the band film 8 located immediately before the embossing unit can be separated far away from the heating unit.

Fourth Embodiment

Figure 9:
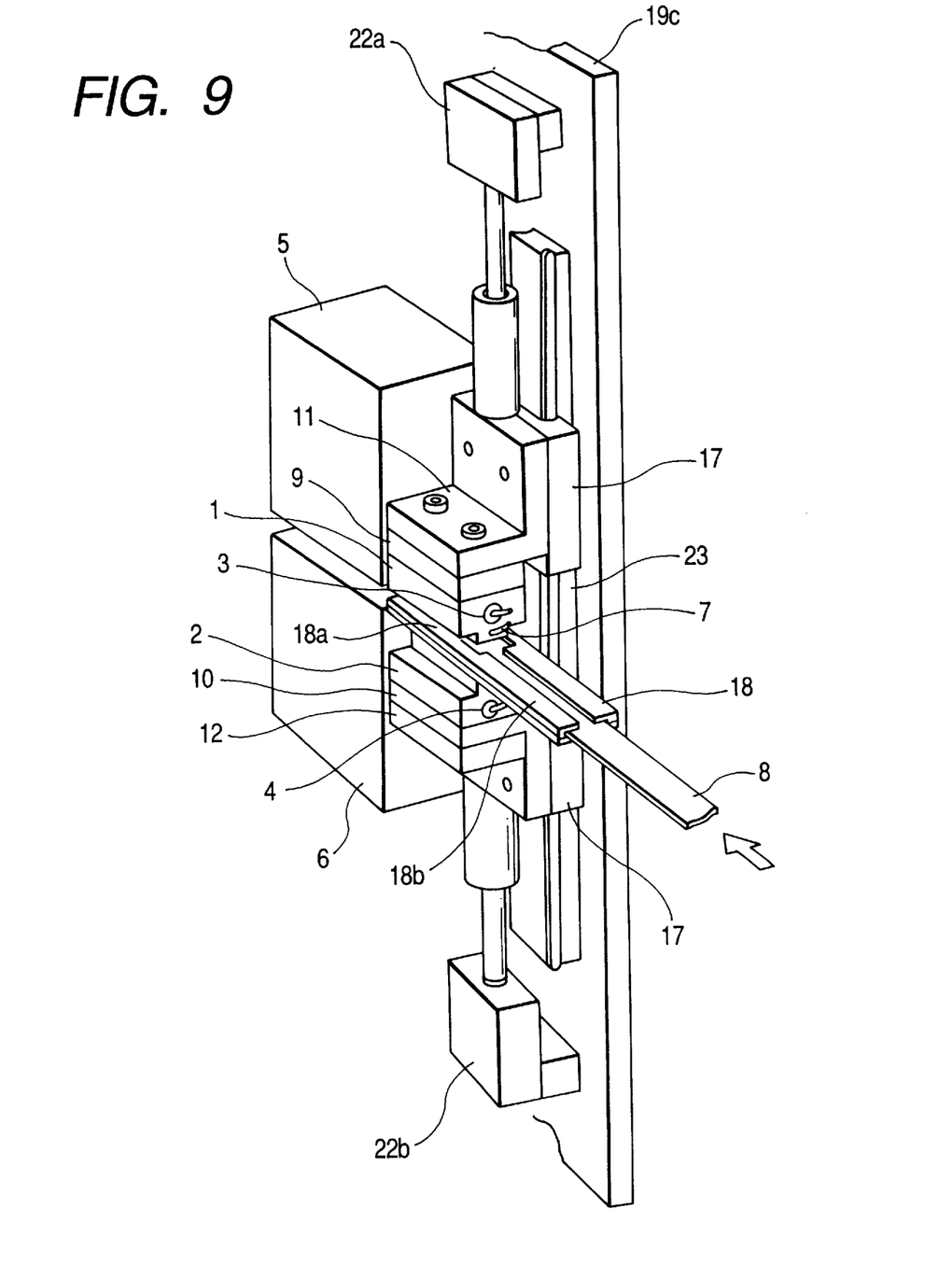
FIG. 9 is a perspective view showing a schematic arrangement of another modified band film thermal processing apparatus in accordance with a fourth embodiment of the present invention.

FIG. 9 is a perspective view showing a schematic arrangement of another modified band film thermal processing apparatus in accordance with a fourth embodiment of the present invention.

The fourth embodiment shown in FIG. 9 differs from the first embodiment shown in FIG. 1 in that the heating unit is widely shiftable in the up-and-down direction to keep the heating bodies 1 and 2 far away from the band film 8.

In the same manner as the first embodiment, the upper and lower heating bodies 1 and 2 are respectively fixed to the upper and lower frames 11 and 12 via heat-insulation plates 9 and 10. The upper and lower frames 11 and 12 are supported by the slide guides 17 slidable along the guide rail 23 extending in the up-and-down direction. The guide rail 23 is fixed directly on a stationary base frame 19c.

The stationary base frame 19c has a vertical surface on which the guide rail 23 is fixed. The upper and lower frames 11 and 12 are respectively connected to upper and lower air cylinders 22a and 22b provided on the surface of the base frame 19c. The upper and lower heating bodies 1 and 2 are shiftable in the up-and-down direction.

More specifically, the upper and lower heating bodies 1 and 2 cooperatively cause a symmetrical up-and-down shift movement with predetermined timings and strokes during the heating operation in the same manner as the above-described embodiments.

Figure 10:
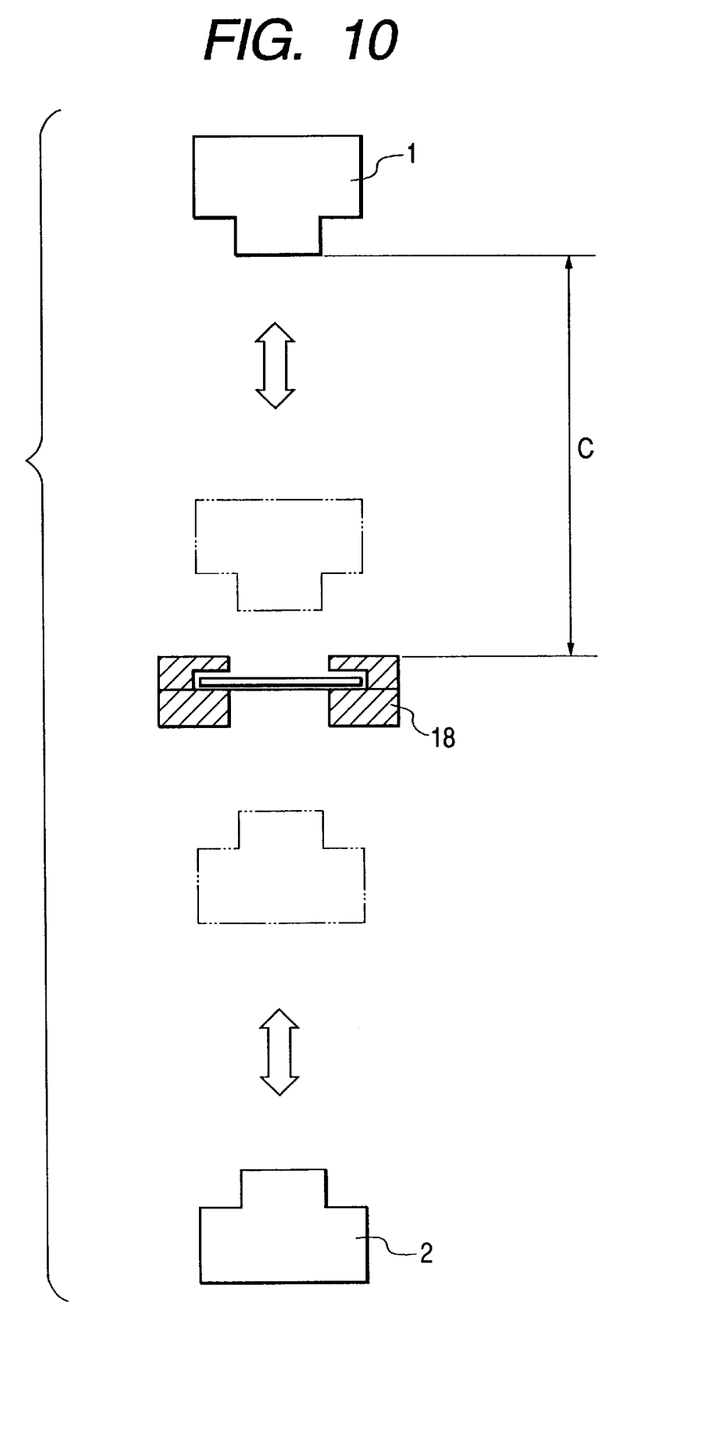
FIG. 10 is a partly cross-sectional front view showing a vertically shifted condition of the heating unit in accordance with the fourth embodiment of the present invention.

Upon interruption or completion of the thermal processing of the band film 8, the upper and lower air cylinders 22a and 22b widely separate the upper and lower frames 11 and 12 in the up-and-down direction. A shifting stroke in this case is longer than the stroke during the heating operation, so that the above-described horizontal distance "C" is kept between the film guide 18 and each heating body 1 or 2 as shown in FIG. 10.

When the thermal processing of the band film 8 resumes or restarts, the upper and lower air cylinders 22a and 22b return the upper and lower heating bodies 1 and 2 to their home positions adjacent to the film guide 18.

With this wider vertical shift movement of the heating bodies 1 and 2, it becomes possible to keep the band film 8 far away from the heating bodies 1 and 2 during the dormant period of the thermal processing apparatus.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A thermal processing apparatus comprising:

a heating unit including a pair of heating bodies for heating a band film conveyed along a predetermined film feeding path defined by a film guide;

an embossing unit including a punch and a die for forming a predetermined raised pattern on a heated surface of said band film; and a shifting mechanism for controllably shifting said heating bodies in opposed first and second directions with predetermined strokes during a thermal processing operation, said strokes being so short that said band film may be subjected to an excessive temperature increase when held continuously between said heating bodies without being conveyed along said predetermined film feeding path wherein said shifting mechanism shifts said heating bodies in said first and second directions to controllably position said heating bodies adjacent to a surface of said band film to increase the temperature of said surface of the band film to a predetermined value, and shifts said heating bodies in a third direction transverse to said first and second directions to separate said heating bodies from said band film by a distance sufficient to prevent thermal damage when said thermal processing is interrupted or stopped.

2. The thermal processing apparatus of claim 1, wherein said distance is equivalent to 0.8 to 2.0 times a width of said band film.

3. A thermal processing apparatus comprising:

a heating unit including a pair of heating bodies each accommodating a heater;

a first shifting mechanism for shifting said heating bodies in opposed first and second directions with predetermined strokes during a thermal processing operation to intermittently position said heating bodies adjacent to a surface of a band film conveyed along a predetermined film feeding path defined by a film guide, to increase the temperature of said surface to a predetermined value, said strokes being so short that said band film may be subjected to an excessive temperature increase when held continuously between said heating bodies without being conveyed along said predetermined film feeding path;

an embossing unit including a punch and a die disposed adjacent to said heating bodies for forming a predetermined raised pattern on a heated surface of said band film; and a second shifting mechanism for shifting said heating bodies in a third direction transverse to said first and second directions, to separate said heating bodies from said band film by a distance sufficient to prevent thermal damage.

4. The thermal processing apparatus in accordance with claim 3, wherein said second shifting mechanism shifts said heating bodies in said third direction when the thermal processing of said band film is interrupted or stopped.

5. The thermal processing apparatus in accordance with claim 3, wherein said second shifting mechanism shifts said heating bodies in a direction different from said film feeding path.

6. The thermal processing apparatus in accordance with claim 5, wherein the shifting direction of said heating bodies by said second shifting mechanism is normal to said film feeding path.

7. The thermal processing apparatus in accordance with claim 3, wherein said second shifting mechanism comprises a transfer frame mounting said heating bodies.

8. The thermal processing apparatus in accordance with claim 7, wherein said second shifting mechanism includes an air cylinder shifting said transfer frame.

9. The thermal processing apparatus in accordance with claim 3, wherein said first shifting mechanism comprises a cam and a cam follower.

10. The thermal processing apparatus of claim 3, wherein said distance is equivalent to 0.8 to 2.0 times a width of said band film.

* * * * *